Figure 1:
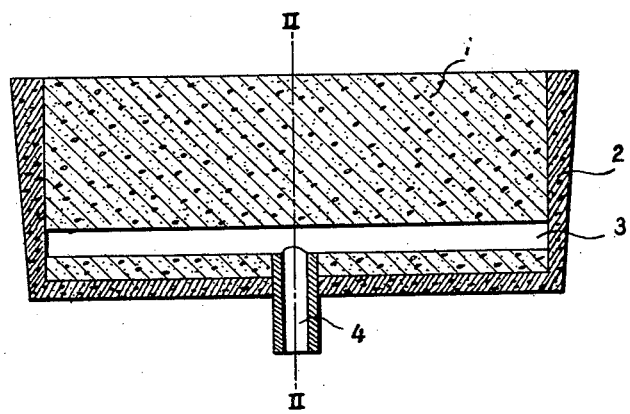

Sept. 11, 1962  P. LEROY ET AL  3,053,525
POROUS REFRACTORY CONCRETE ELEMENT
Filed June 7, 1960  3 Sheets-Sheet 1

INVENTORS
PIERRE LEROY
ROGER SIMON

BY /s/ Kurt Kelman
AGENT

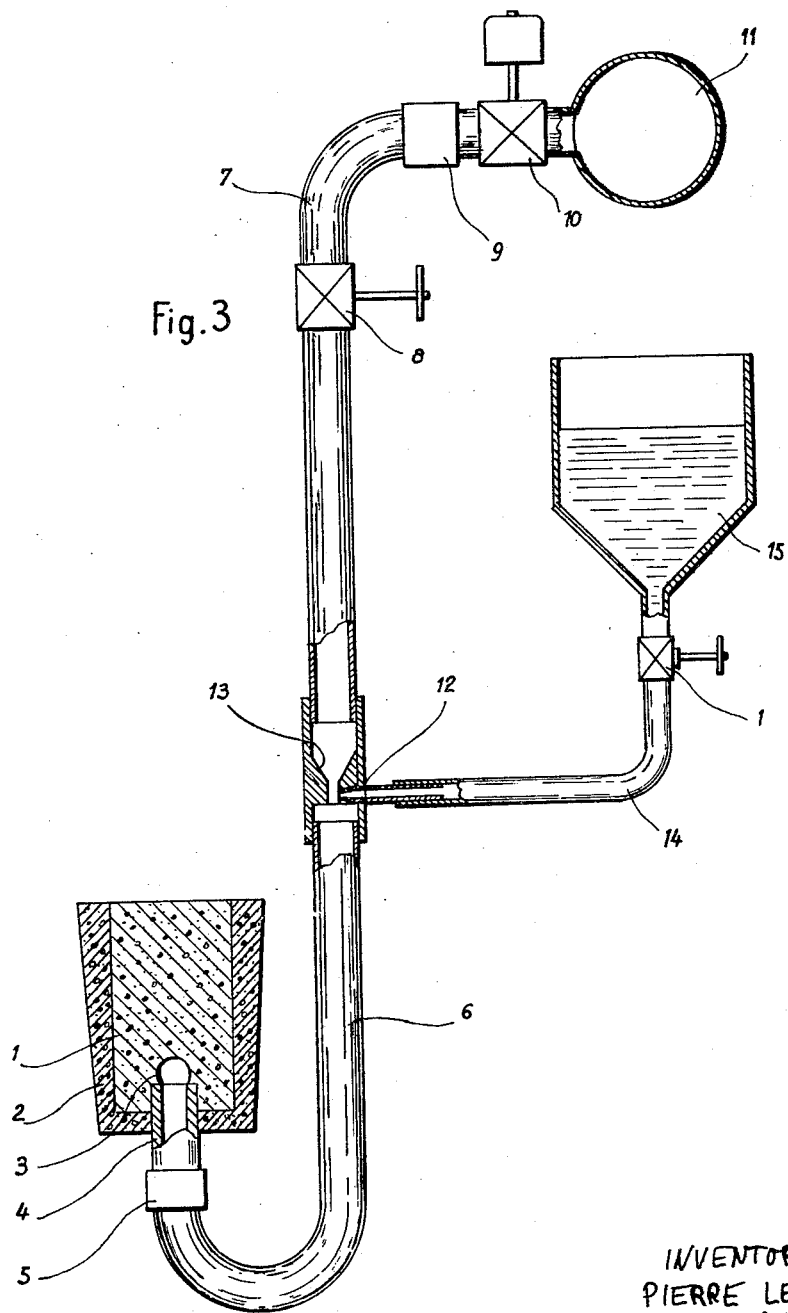

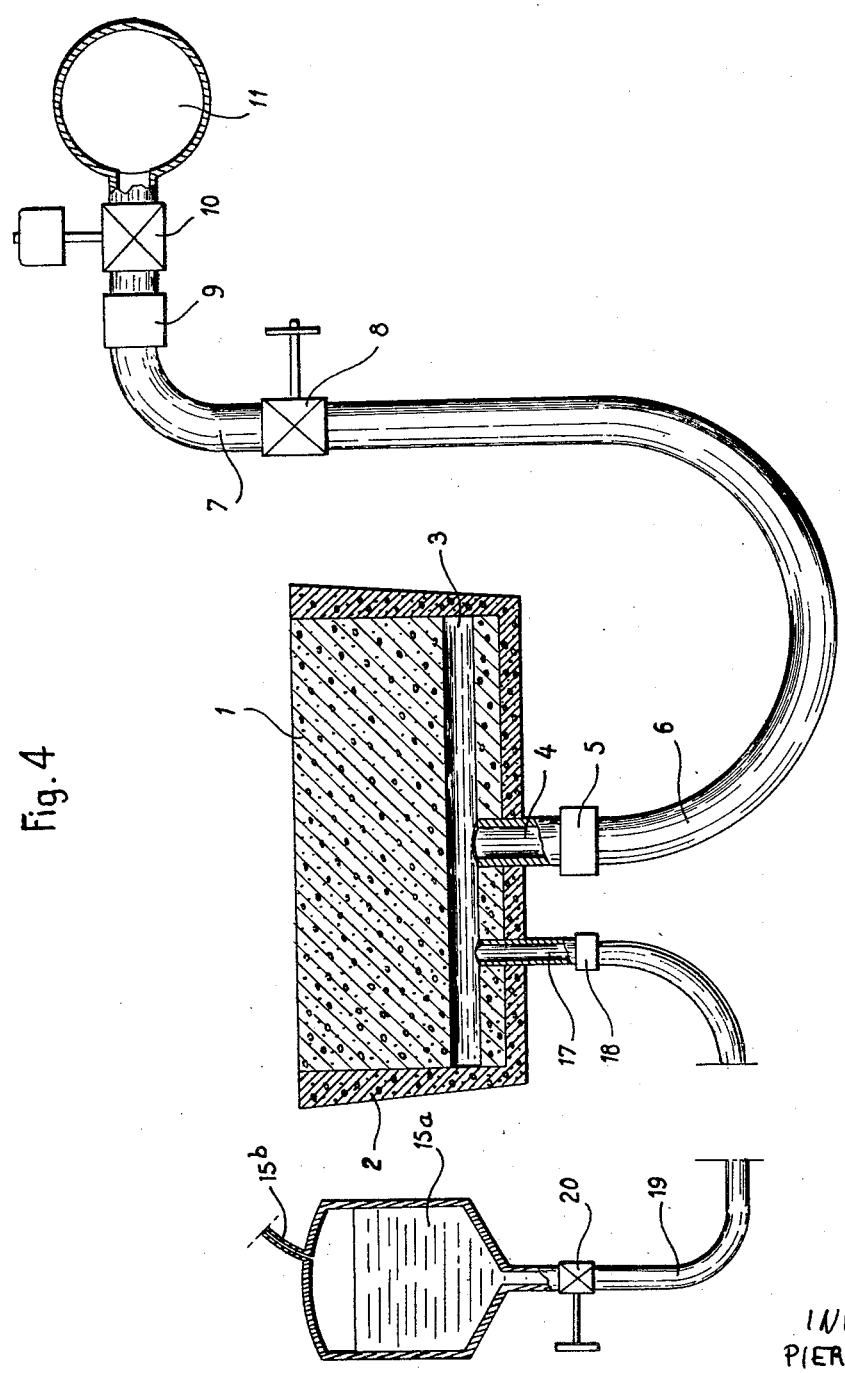

United States Patent Office 3,053,525
Patented Sept. 11, 1962

3,053,525
POROUS REFRACTORY CONCRETE ELEMENT
Pierre Leroy, Saint Germain-en-Laye, and Roger Simon, Marly-le-Roi, France, assignors to Institut de Recherches de la Siderurgie Francais, Saint Germain-en-Laye, France, an institut of France
Filed June 7, 1960, Ser. No. 34,578
Claims priority, application France Aug. 19, 1958
5 Claims. (Cl. 266—34)

The present invention relates to porous refractory concrete elements, and more particularly to such elements used in the refining of molten metal.

In metal refining, it has been proposed to insufflate a gas into a mass of molten metal in a container through a porous refractory element, the porous element being connected with a supply of compressed gas in a fluid-impermeable manner and having a permeable surface in contact with the liquid metal to be refined. The refractory elements used hitherto were made of conventional refractory materials generally used for metallurgical purposes. This has two disadvantages: on the one hand, it is necessary to make such a material very porous and this is difficult because such materials are comparatively homogeneous and the higher their porosity the lower their coherence. Furthermore, it has been found that it was practically impossible to apply a sufficiently fluid-tight layer over the lateral surfaces of an element made of such material since the firing always produces a shrinking of the porous core and this prevents a satisfactory adhesion of a fluid-tight layer over the core of the element.

Our invention has for its main object to remove these drawbacks by producing a porous member, such as a plug or slab, made of refractory concrete.

Furthermore, in any operation wherein the concrete surface through which the gas is blown is subjected to a high temperature, it has been observed that the surface gradually loses coherence when it is dehydrated.

It is, therefore, another object of the present invention to provide means for rehydrating the permeable surface and thus notably to increase the life of the porous member when it is used for the metallurgical treatment of a liquid metal.

The above and other objects are accomplished in accordance with this invention by a refractory concrete element comprising a core of porous refractory concrete composed of an aggregate of a particle size of no less than 0.2 mm. and preferably more than 0.5 mm. and a high refractory cement and a layer of fluid impermeable refractory concrete coating all but one of the surfaces of the porous core, said fluid impermeable coating being composed of an aggregate having a high proportion of fines and a high refractory cement. The porous refractory concrete core defines at least one interior channel and at least one gas feeding pipe pierces the fluid impermeable layer and opens into the interior channel so that gas may be insufflated through the porous core into a liquid metal in contact with the surface which is not coated with the layer.

According to one embodiment of the invention, a channel member such as a metal or plastic pipe, may be embedded in the core to define the interior channel and this channel member has at least one opening in communication with the porous core. The opening may be a narrow longitudinal slot along the entire length of the channel member to provide an even distribution of the gas and also to give resiliency to the member.

Preferably, means is provided for feeding water into the interior core channel as well as means for regulating the water feed rate so that the water is vaporized before it reaches the porous concrete core surface in contact with the liquid metal.

Figure 2:
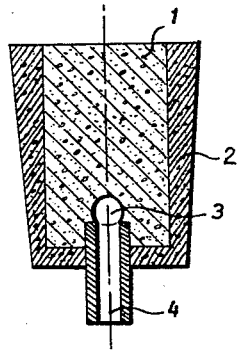
Figure 2A:
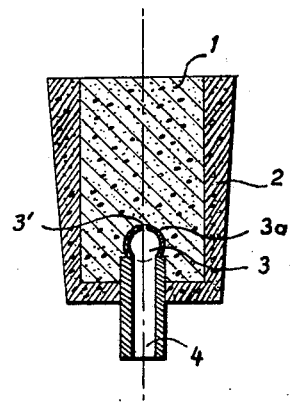

The above and other advantages, objects and features of the present invention will be more fully understood by reference to the following detailed description of certain preferred embodiments thereof, taken in conjunction with the accompanying drawing wherein FIG. 1 is a longitudinal section of a porous plug or slab according to one embodiment of the invention;
FIG. 2 is a section along line II—II of FIG. 1;
Fig. 2a is a section along line II—II of FIG. 1 showing a modification of the element of FIG. 1;
FIG. 3 is a side view, partly in section, of the device for blowing gas into the porous member and an arrangement for spraying water into the gas pipe; and
FIG. 4 is a front view, partly in section, of another means for supplying gas and water to the interior of the porous member.

Referring now to FIG. 1, the core 1 of the slab is made of porous refractory concrete and is coated on five of its surfaces with a thin layer 2 of fluid impermeable refractory concrete. The sixth surface of the core is not coated and thus allows gas to be insufflated into liquid metal (not shown) in contact therewith.

The porous concrete forming the core of the slab is manufactured from a high refractory cement and an aggregate practically devoid of fine particles of less than 0.2 mm. size. The desired porosity is determined by the particle sizes of the aggregate, the permeability of the core increasing the more coarser particles are used. In contradistinction, the fluid impermeable refractory concrete forming the layer, which prevents any gas leak through the walls, contains an aggregate with a high proportion of fines, i.e. more than 50%, by weight, of particles not exceeding 1.0 mm. and preferably more than 25%, by weight, of particles not exceeding 0.2 mm.

It will thus be appreciated that the refractory property of the concrete core and surface layers is imparted to the concrete by the high refractory cement forming its matrix while its porosity and impermeability, respectively, depend in the particle size of the aggregate, the more coarser particles are used the higher the porosity and the more finer particles are used the higher the impermeability.

Preferred cements of high refractory properties will be disclosed in the following specific examples which illustrate satisfactory concretes.

Example I

A highly porous concrete of high refractory quality (fusion point: 1480° C.) was prepared from the following mixture:

| Aggregate | | Percent by weight |
|---|---|---|
| Calcined alumina silicate $Al_2O_3SiO_2$ or chamotte, with a particle size of— | | |
|   less than 0.5 mm. | | 0 |
|   0.5 mm. to 1 mm. | | 30.0 |
|   1 to 2 mm. | | 35.0 |
| Highly refractory cement: | Percent | |
|   $Al_2O_3$ | 40 | 7.5 |
|   $CaO$ | 40 | 7.5 |
|   $SiO_2$ | 10 | 2.0 |
|   $Fe_2O_3$ | 10 | 2.0 |
|   Total | 100 | |
| Water of constitution | | 16.0 |
| | | 100.0 |

Example II

A highly porous concrete of very high refractory quality (fusion point: 1800° C.) was prepared from the following mixture:

| Aggregate | | Percent by weight |
|---|---|---|
| α-alumina consisting of 93% to 98% of $Al_2O_3$ and 7 to 2% of $Fe_2O_3$, with a particle size of— | | |
| less than 0.5 mm | | 0 |
| 0.5 mm. to 1 mm | | 34.0 |
| 1 to 2 mm | | 40.5 |
| Very highly refractory cement: | Percent | |
| $Al_2O_3$ | 75 | 10.0 |
| CaO | 25 | 3.5 |
| Impurities less than | 0.2 | trace |
| | 100 | |
| Water of constitution | | 12.0 |
| | | 100.0 |

Example III

A fluid impermeable concrete of high refractory quality (fusion point: 1480° C.) was prepared from the following mixture:

| Aggregate | | Percent by weight |
|---|---|---|
| Calcined alumina silicate $Al_2O_3SiO_3$ or chamotte, with a particle size of— | | |
| up to 0.2 mm | | 27.0 |
| 0.2 mm. to 0.5 mm | | 17.0 |
| 0.5 mm. to 1 mm | | 12.0 |
| Highly refractory cement: | Percent | |
| $Al_2O_3$ | 40 | 10.5 |
| CaO | 40 | 10.5 |
| SiO | 10 | 3.0 |
| $Fe_2O_3$ | 10 | 3.0 |
| | 100 | |
| Water of constitution | | 17.0 |
| | | 100.0 |

Example IV

A fluid impermeable concrete of very high refractory quality (fusion point: 1800° C.) was prepared from the following mixture:

| Aggregate | | Percent by weight |
|---|---|---|
| α-alumina consisting of 93% to 98% of $Al_2O_3$ and 7 to 2% of $Fe_2O_3$, with a particle size of— | | |
| up to 0.2 mm | | 32.5 |
| 0.2 mm. to 0.5 mm | | 20.5 |
| 0.5 mm. to 1 mm | | 15.0 |
| Very high refractory cement: | Percent | |
| $Al_2O_3$ | 75 | 15.5 |
| CaO | 25 | 5.0 |
| Impurities less than | 0.2 | trace |
| | 100 | |
| Water of constitution | | 11.5 |
| | | 100.0 |

The fluid impermeable layers will be bonded to the porous core only if the two types of concrete are caused to set simultaneously so that our porous refractory concrete element must be prepared in a single operation in one mold, the mold being first lined with the fluid impermeable concrete and, before this concrete is set, the porous concrete is poured into the mold to form the core.

The slab illustrated by way of example is of a parallelepipedic shape. Being comparatively narrow, it is provided with a single interior gas distributing channel 3, extending along the lower section of the slab longitudinally of the porous core without passing through the fluidtight walls formed by the outer layers 2.

As shown in FIG. 1, the interior channel may be molded into the concrete core, for instance by holding a suitably shaped soluble or combustible molding core in the concrete mixture and washing or burning it after the concrete has set, thus producing an internal bore in the body.

Alternatively, as shown in FIG. 2a, a channel member 3a of suitable cross section may be provided and remain in the concrete core, the only requirement being that the channel member have communication with the concrete through suitable port means. The illustrated port means is constituted by a longitudinally extending slot 3' in the sleeve-like channel member 3a through which gas supplied to the channel member is evenly distributed to the concrete core 1.

The longitudinal channel 3 or 3a is fed with the gas to be blown in through an axially directed input connection 4 constituted either by a metal pipe sealed inside the concrete or else by a channel obtained in the molding and inside which is fitted an outer pipe provided with a suitable packing.

According to FIG. 3, a coupling 5 mounted on the pipe 4 connects the latter to a hose 6 which is in turn connected to a pipe 7 through a valve 8. A safety valve 9 and an electro-valve 10 connect pipe 7 to a main pipe 11.

Downstream with respect to valve 8, a nozzle 12 entering a convergent conduit 13 causes water fed by a pipe 14 to be atomized, pipe 14 being connected to a water tank 15 through an adjusting valve 16. The adjusting valve makes it possible to obtain an even flow of water and to adjust this flow to the optimum degree of hydration which is required for the porous member, without going above the flow which would bring non-atomized water in contact with the melted pig iron or other melted metal. The atomized water, which is vaporized before it reaches the porous concrete core surface in contact with the liquid metal, produces an important cooling effect which is favorable for the life of the porous concrete.

Concrete particles have such high coherence that the porous core of our refractory concrete element may be sufficiently permeable to permit the interior gas distributing channel to be positioned in the lower section of the slab, which arrangement would not be possible in such elements made from other porous refractory materials unless the throughput were substantially reduced. The presence of a large mass of concrete above the gas distributing channel provides a layer of substantial thickness through which the gas is insufflated into the liquid metal to be refined and thus permits the performance of a number of blowing operations before the slab wears out, the concrete element wearing uniformly during each operation.

Prefereably, the water flow rate is so adjusted that 15 liters of water per minute are supplied per square meter of surface in contact with the liquid metal.

In the arrangement of FIG. 4, the porous slab comprises a connection 17 entering the longitudinal channel 3. A coupling 18 mounted on the connection 17 connects the latter to a hose 19. The hose is connected to a reservoir 15a containing water under air pressure through an adjusting valve 20. The pressure is obtained by means of a pipe 15b connected to a source of air pressure, not shown. When the valve 20 is open properly, water rises in the porous part of the slab until it is changed into vapor in the layers which are at a high temperature. For the sake of safety, the blowing of gas through hose 6 may be stopped when the slab is being rehydrated. This arrangement, like the arrangement of FIG. 3 increases notably the life of the porous slab.

While the invention has been described in connection with certain specific embodiments and examples, it will be understood that many modifications and variations will readily occur to the skilled in the art, particularly after benefiting from the present teaching without departing from the spirit and scope of this invention as defined in the appended claims.

This is a continuation-in-part of our application Serial No. 762,822, filed September 23, 1958 now abandoned.

What we claim is:

1. A refractory concrete element comprising a core of porous refractory concrete composed of an aggregate of a particle size of no less than 0.2 mm. and a high refractory cement, and a layer of fluid impermeable refractory concrete coating all but one of the surfaces of the porous core, said fluid impermeable layer being composed of an aggregate having a high proportion of fines and a high refractory cement, said one surface being arranged for being in contact with a liquid metal, and said porous core defining at least one interior channel, and at least one gas feeding conduit piercing the fluid impermeable concrete layer and opening into said channel.

2. A refractory concrete element comprising a core of porous refractory concrete composed of an aggregate of a particle size of no less than 0.2 mm. and a high refractory cement, and a layer of fluid impermeable refractory concrete coating all but one of the surfaces of the porous core, said fluid impermeable layer being composed of an aggregate having a high proportion of fines and a high refractory cement, said one surface being arranged for being in contact with a liquid metal, at least one channel member having port means embedded in said porous core, and at least one gas feeding conduit piercing the fluid impermeable concrete layer and opening into said channel member.

3. A refractory concrete element comprising a core of porous refractory concrete composed of an aggregate of a particle size of no less than 0.2 mm. and a high refractory cement, and a layer of fluid impermeable refractory concrete coating all but one of the surfaces of the porous core, said fluid impermeable layer being composed of an aggregate having a high proportion of fines and a high refractory cement, said one surface being arranged for being in contact with a liquid metal, said porous concrete body defining at least one interior channel, at least one gas feeding pipe piercing the fluid-impermeable concrete layer and opening into said channel, means for feeding water into said interior channel and means for regulating the water feed rate so that the water is vaporized before it reaches the porous concrete body surface in contact with the liquid metal.

4. A refractory concrete element comprising a core of porous refractory concrete composed of an aggregate of a particle size of no less than 0.2 mm. and a high refractory cement, and a layer of fluid impermeable refractory concrete coating all but one of the surfaces of the porous core, said fluid impermeable layer being composed of an aggregate having a high proportion of fines and a high refractory cement, said one surface being arranged for being in contact with a liquid metal, said porous concrete body defining at least one interior channel, at least one gas feeding pipe piercing the fluid-impermeable concrete layer and opening into said channel, a converging portion in said gas feeding pipe, a nozzle associated with said converging pipe portion, a water supply connected to said nozzle and an adjusting valve for regulating the water supply to said nozzle.

5. A refractory concrete element comprising a core of porous refractory concrete composed of an aggregate of a particle size of no less than 0.2 mm. and a high refractory cement, and a layer of fluid impermeable refractory concrete coating all but one of the surfaces of the porous core, said fluid impermeable layer being composed of an aggregate having a high proportion of fines and a high refractory cement, said one surface being arranged for being in contact with a liquid metal, said porous concrete body defining at least one interior channel, at least one gas feeding pipe piercing the fluid-impermeable concrete layer and opening into said channel, a water supply, means for maintaining the water supply under pressure, a pipe connecting the pressurized water supply with said interior channel and an adjusting valve in the latter pipe for regulating the water supply to said interior channel.

References Cited in the file of this patent

UNITED STATES PATENTS

| | | |
|---|---|---|
| 1,763,248 | Moore | June 10, 1930 |

FOREIGN PATENTS

| | | |
|---|---|---|
| 498,983 | Belgium | Nov. 14, 1950 |
| 1,072,558 | France | Apr. 3, 1955 |
| 1,160,489 | France | Mar. 3, 1958 |